(12) United States Patent
Hsu et al.

(10) Patent No.: US 10,591,959 B1
(45) Date of Patent: Mar. 17, 2020

(54) BENDABLE DISPLAYING APPARATUS AND SUPPORTING DEVICE

(71) Applicant: FOSITEK CORPORATION, New Taipei (TW)

(72) Inventors: An-Szu Hsu, New Taipei (TW); Way-Han Dai, New Taipei (TW); Shao-Chun Chao, New Taipei (TW); Chun-Han Lin, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 16/356,670

(22) Filed: Mar. 18, 2019

(30) Foreign Application Priority Data

Oct. 29, 2018 (TW) .............................. 107214678 U

(51) Int. Cl.
*H05K 5/00* (2006.01)
*G06F 1/16* (2006.01)
*G09F 9/30* (2006.01)

(52) U.S. Cl.
CPC .......... *G06F 1/1652* (2013.01); *G06F 1/1681* (2013.01); *G09F 9/301* (2013.01)

(58) Field of Classification Search
CPC ....................................................... H05K 5/00
See application file for complete search history.

(56) References Cited

U.S. PATENT DOCUMENTS

| 10,070,546 | B1* | 9/2018 | Hsu ........................... E05D 3/06 |
| 2011/0063809 | A1* | 3/2011 | Hoshino ............... G06F 1/1616 |
| | | | 361/752 |
| 2012/0175478 | A1* | 7/2012 | Chen ..................... G06F 1/1624 |
| | | | 248/286.1 |
| 2018/0067520 | A1* | 3/2018 | Maatta .................. G06F 1/1618 |

* cited by examiner

*Primary Examiner* — Jerry Wu
(74) *Attorney, Agent, or Firm* — Li & Cai Intellectual Property (USA) Office

(57) ABSTRACT

A bendable displaying apparatus of the present disclosure includes two housings, a supporting device, and a bendable display. The supporting device is fastened to the two housings and is arranged between the two housings. The supporting device includes a retainer, two supporting units, a first supporting plate, and two second supporting plates. The bendable display is disposed on the two housings, the first supporting plate, and the two second supporting plates. When the two housings are moved to stack with each other, the two housings drive the two supporting units to move the two second supporting plates along a direction away from each other and drives the retainer to downwardly move the first supporting plate, so that the two second supporting plates and the first supporting plate jointly form a space that provides the bendable display to deform therein.

10 Claims, 8 Drawing Sheets

BENDABLE DISPLAYING APPARATUS AND SUPPORTING DEVICE

CROSS-REFERENCE TO RELATED PATENT APPLICATION

This application claims the benefit of priority to Taiwan Patent Application No. 107214678, filed on Oct. 29, 2018. The entire content of the above identified application is incorporated herein by reference.

FIELD OF THE DISCLOSURE

The present disclosure relates to a displaying apparatus, and more particularly to a bendable displaying apparatus and a supporting device.

BACKGROUND OF THE DISCLOSURE

A conventional bendable displaying apparatus includes a bendable display and a supporting device that is formed to support the deformation of the bendable display. The cooperation between the supporting device and the bendable display needs to have a very accurate requirement for preventing the supporting device from damaging the bendable display as bending. However, due to the strict engineering tolerance for the cooperation between the supporting device and the bendable display, the productivity of the conventional bendable displaying apparatus is difficult to be increased.

SUMMARY OF THE DISCLOSURE

In response to the above-referenced technical inadequacies, the present disclosure provides a bendable displaying apparatus and a supporting device to effectively improve the issues associated with conventional bendable displaying apparatus. Specifically, the supporting device can provide a suitable space for allowing the bendable display to deform therein, and the cooperation between the supporting device and the bendable display is simplified and still allows the bendable display to be protected through the supporting device, so that the productivity of the bendable displaying apparatus can be increased.

In one aspect, the present disclosure provides a bendable displaying apparatus, which includes two housings, a supporting device, and a bendable display. The supporting device is disposed between the two housings and is pivotally connected to the two housings. The supporting device includes a retainer, two supporting units, a first supporting plate, two second supporting plates, and two positioning mechanisms. The two sides of the two housings are respectively and pivotally connected to two sides of the retainer, and the retainer has four sliding slots respectively and slantingly recessed in the two sides thereof. The two supporting units are disposed on the retainer and are respectively located adjacent to the two sides of the retainer, each of the two supporting units includes two connecting levers each having a first end portion and an opposite second end portion and an interlocking seat. The first end portions of the connecting levers of the two supporting units are respectively and pivotally connected to the two sides of the two housings, and the second end portions of the connecting levers of the two supporting units each have a sliding shaft. The sliding shafts of the connecting levers of the two supporting units are respectively and slidably arranged in the sliding slots of the retainer, so that the second end portions of the connecting levers of the two supporting units are respectively slidable relative to the two sides of the retainer. The interlocking seats of the two supporting units are liftably disposed on the retainer and each are connected to the two housings. When the two housings are rotated to locate on the same plane and are located at a flat position, the sliding shafts of the connecting levers are moved to one ends of the sliding slots, and the two housings drive the interlocking seats of the two supporting units to upwardly move. When the two housings are rotated to stack with each other and are located at a folded position, the sliding shafts of the connecting levers are moved to the other ends of the sliding slots, and the two housings drive the interlocking seats of the two supporting units to downwardly move. The two positioning mechanisms are respectively arranged adjacent to and positioned with the interlocking seats of the two supporting units, the first supporting plate is fixed to the interlocking seats of the two supporting units, and the two second supporting plates are fixed to the connecting levers of the two supporting units. The bendable display is mounted on the two housings, the first supporting plate, and the two second supporting plates. When the two housings are rotated to stack with each other, the two housings rotate the connecting levers of the two supporting units to move the two second supporting plates along a direction away from each other, and the two housings drive the interlocking seats of the two supporting units to downwardly move the first supporting plate, so that the two second supporting plates and the first supporting plate jointly form a space that provides the bendable display to deform therein. The two positioning mechanisms are configured to allow the bendable displaying apparatus to be selectively maintained at the flat position and the folded position.

In one aspect, the present disclosure provides a supporting device for being pivotally connected to two housings. The supporting device includes a retainer, two supporting units, a first supporting plate, two second supporting plates, and two positioning mechanisms. Two sides of the retainer are configured to respectively and pivotally connect to two sides of the two housings, and the retainer has four sliding slots respectively and slantingly recessed in the two sides thereof. The two supporting units disposed on the retainer and respectively located adjacent to the two sides of the retainer. Each of the two supporting units includes two connecting levers each having a first end portion and an opposite second end portion and an interlocking seat. The first end portions of the connecting levers of the two supporting units are configured to respectively and pivotally connect to the two sides of the two housings, and the second end portions of the connecting levers of the two supporting units each have a sliding shaft. The sliding shafts of the connecting levers of the two supporting units are respectively and slidably arranged in the sliding slots of the retainer, so that the second end portions of the connecting levers of the two supporting units are respectively slidable relative to the two sides of the retainer. The interlocking seats of the two supporting units are liftably disposed on the retainer and each are configured to connect to the two housings. When the two housings are rotated to locate on the same plane and are located at a flat position, the sliding shafts of the connecting levers are moved to one ends of the sliding slots, and the two housings drive the interlocking seats of the two supporting units to upwardly move. When the two housings are rotated to stack with each other and are located at a folded position, the sliding shafts of the connecting levers are moved to the other ends of the sliding slots, and the two housings drive the interlocking seats of the two supporting units to downwardly move. The first supporting plate is fixed to the interlocking seats of the two supporting units. The two second supporting plates are respectively fixed to the connecting levers of the two supporting units. The two positioning mechanisms are respectively arranged adjacent to and positioned with the interlocking seats of the two supporting units. When the two housings are rotated to stack with each other, the two housings rotate the connecting levers of the two supporting units to move the two second supporting plates along a direction away from each other, and the two housings drive the interlocking seats of the two supporting units to downwardly move the first supporting plate, so that the two second supporting plates and the first supporting plate jointly form a space that provides a bendable display to deform therein. The two positioning mechanisms are configured to allow the supporting device to be selectively maintained at the flat position and the folded position.

Therefore, when the two housings are moved to stack with each other, the supporting device can drive the two second supporting plates to move away from each other and to drive the first supporting plate to downwardly move, so that the supporting device can provide a suitable space for allowing the bendable display to deform therein, and the cooperation between the supporting device and the bendable display is simplified and still allows the bendable display to be protected through the supporting device. Accordingly, the productivity of the bendable displaying apparatus can be increased. In addition, the two positioning mechanisms of the supporting device can provide a supporting force to the bendable displaying apparatus, thereby allowing the bendable displaying apparatus to be selectively maintained at the flat position and the folded position.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
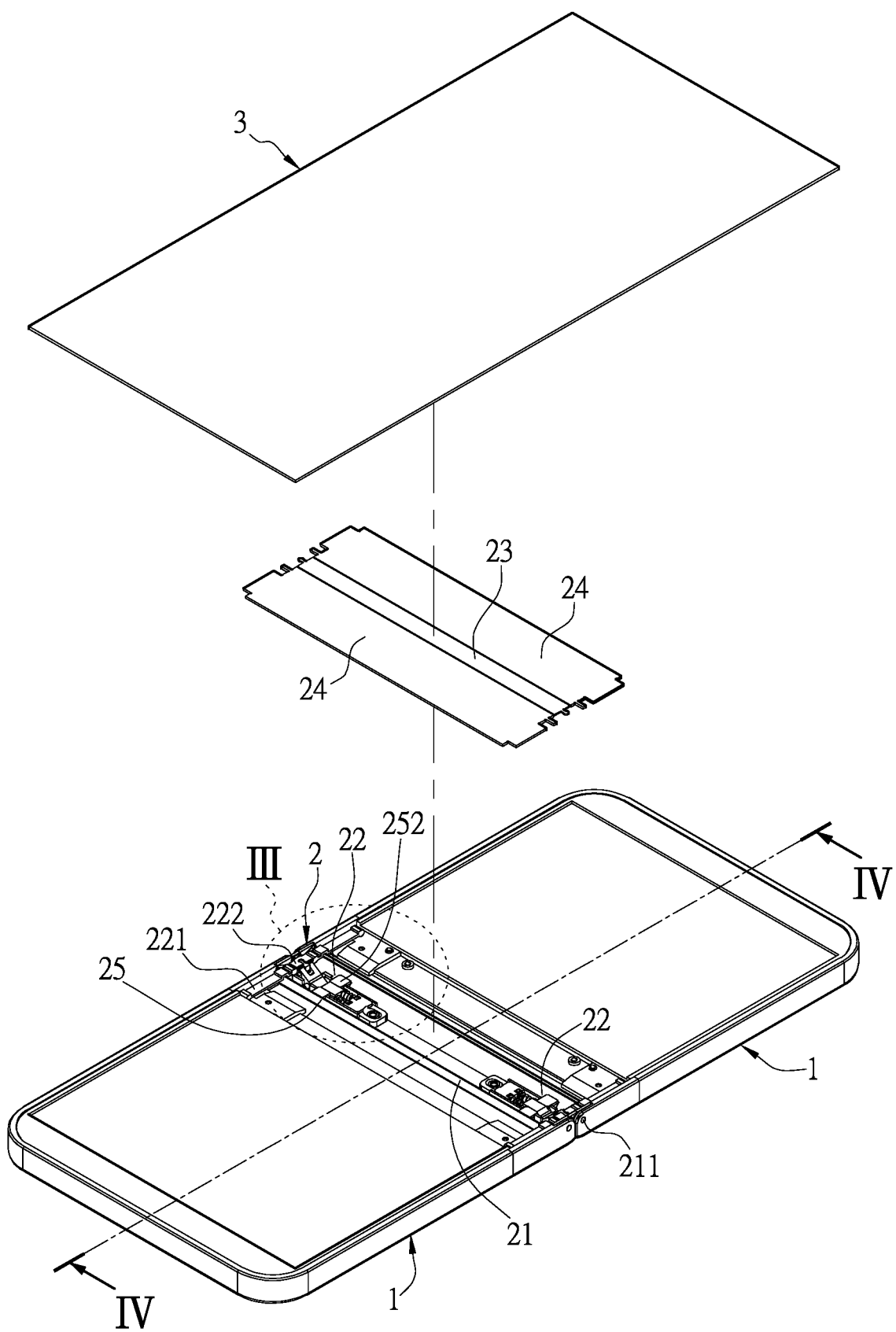
FIG. 1 is a perspective view of a bendable displaying apparatus that is at a flat position according to the present disclosure.
Figure 2:
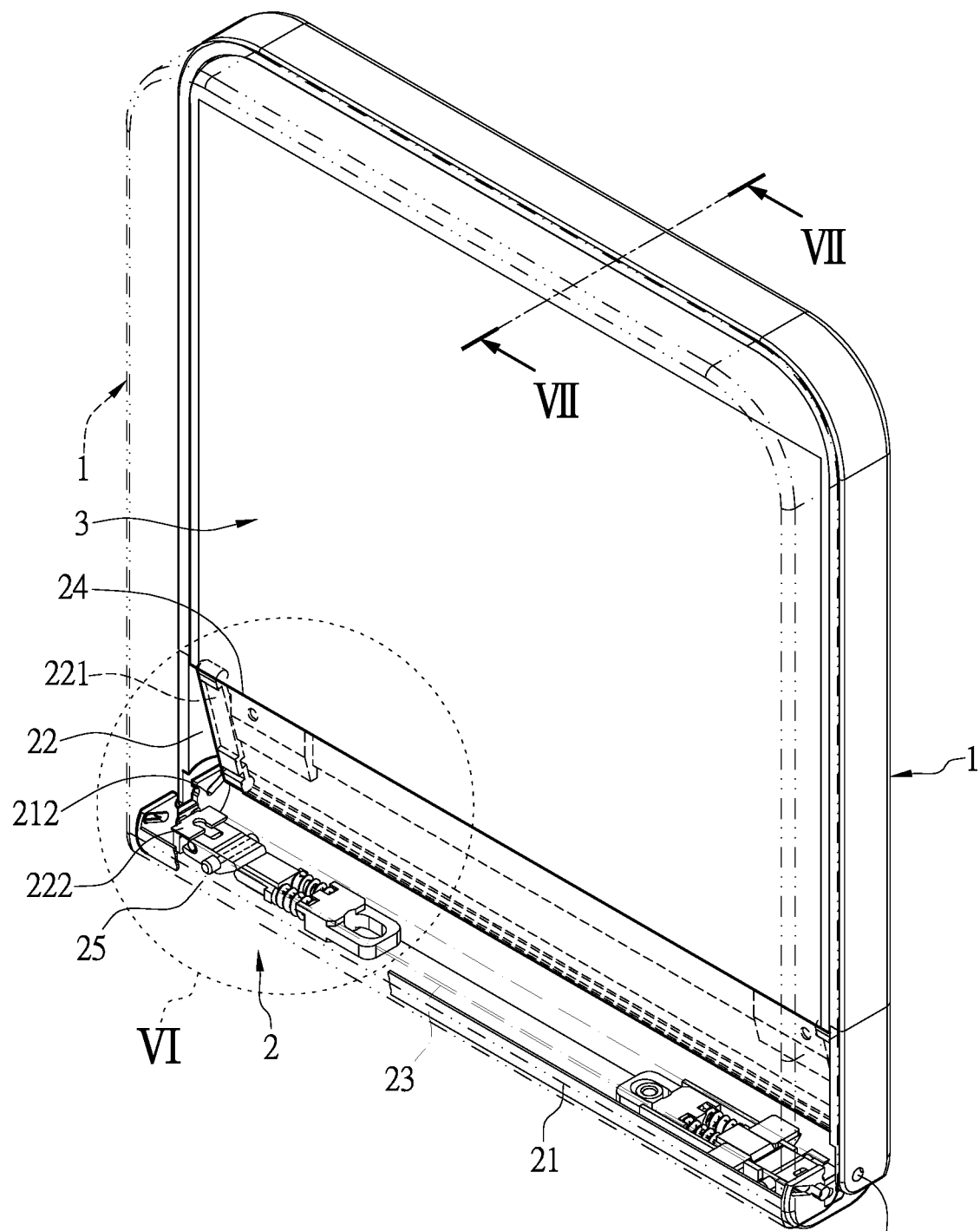
FIG. 2 is a perspective view of the bendable displaying apparatus that is at a folded position according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 8, an embodiment of the present disclosure provides a bendable displaying apparatus, which includes two housings 1, a supporting device 2, and a bendable display 3. The two housings 1 each can be a flat rectangular structure, but the present disclosure is not limited thereto. The two housings 1 are pivotally connected to the supporting device 2, so that the two housings 1 are rotatable relative to the supporting device 2 between a flat position and a folded position. The bendable display 3 is fastened to the two housings 1 and the supporting device 2, so that the bendable display 3 can be bent (or deformed) by the movement of the two housings 1.

The supporting device 2 is disposed between the two housings 1 and is pivotally connected to the two housings 1. The supporting device 2 includes a retainer 21, two supporting units 22, a first supporting plate 23, two second supporting plates 24, and two positioning mechanisms 25. The retainer 21 is a hollow structure for receiving the two supporting units 22. Two sides of the two housings 1 are respectively and pivotally connected to two sides of the retainer 21 by using at least one shaft, so that the two housings 1 are pivotally connected to the supporting device 2 for being moved to the flat position or the folded position. The two sides of the two housings 1 in the present embodiment are arranged adjacent to each other, when the two housings 1 are at the flat position.

The two supporting units 22 are disposed on the retainer 21 and are respectively located adjacent to the two sides of the retainer 21. Each of the two supporting units 22 includes two connecting levers 221 each having a first end portion and an opposite second end portion and an interlocking seat 222. Each of the two connecting levers 221 includes a rotating shaft 2211 and a sliding shaft 2212 respectively arranged on the first end portion and the second end portion thereof. The rotating shafts 2211 of the connecting levers 221 are respectively and pivotally inserted to a plurality of rotating holes 11 that are formed in the two sides of the two housings 1, so that the first end portions of the connecting levers 221 are respectively and pivotally connected to the two sides of the two housings 1. The retainer 21 has four sliding slots 212 respectively and slantingly recessed in the two sides thereof. In one of the two sides of the retainer 21, a distance between one ends (e.g., lower ends) of the two sliding slots 212 is less than a distance between the other ends (e.g., upper ends) of the two sliding slots 212. The sliding shafts 2212 of the connecting levers 221 are respectively and slidably arranged in the sliding slots 212 of the retainer 21, so that the second end portions of the connecting levers 221 are respectively slidable relative to the two sides of the retainer 21. When the two housings 1 are rotated to locate on the same plane (i.e., the two housings 1 are at the flat position), the sliding shafts 2212 of the connecting levers 221 are moved to one ends (e.g., the lower ends shown in FIG. 5) of the sliding slots 212; and when the two housings 1 are rotated to stack with each other (i.e., the two housings 1 are at the folded position), the sliding shafts 2212 of the connecting levers 221 are moved to the other ends (e.g., the upper ends shown in FIG. 8) of the sliding slots 212.

Figure 3:
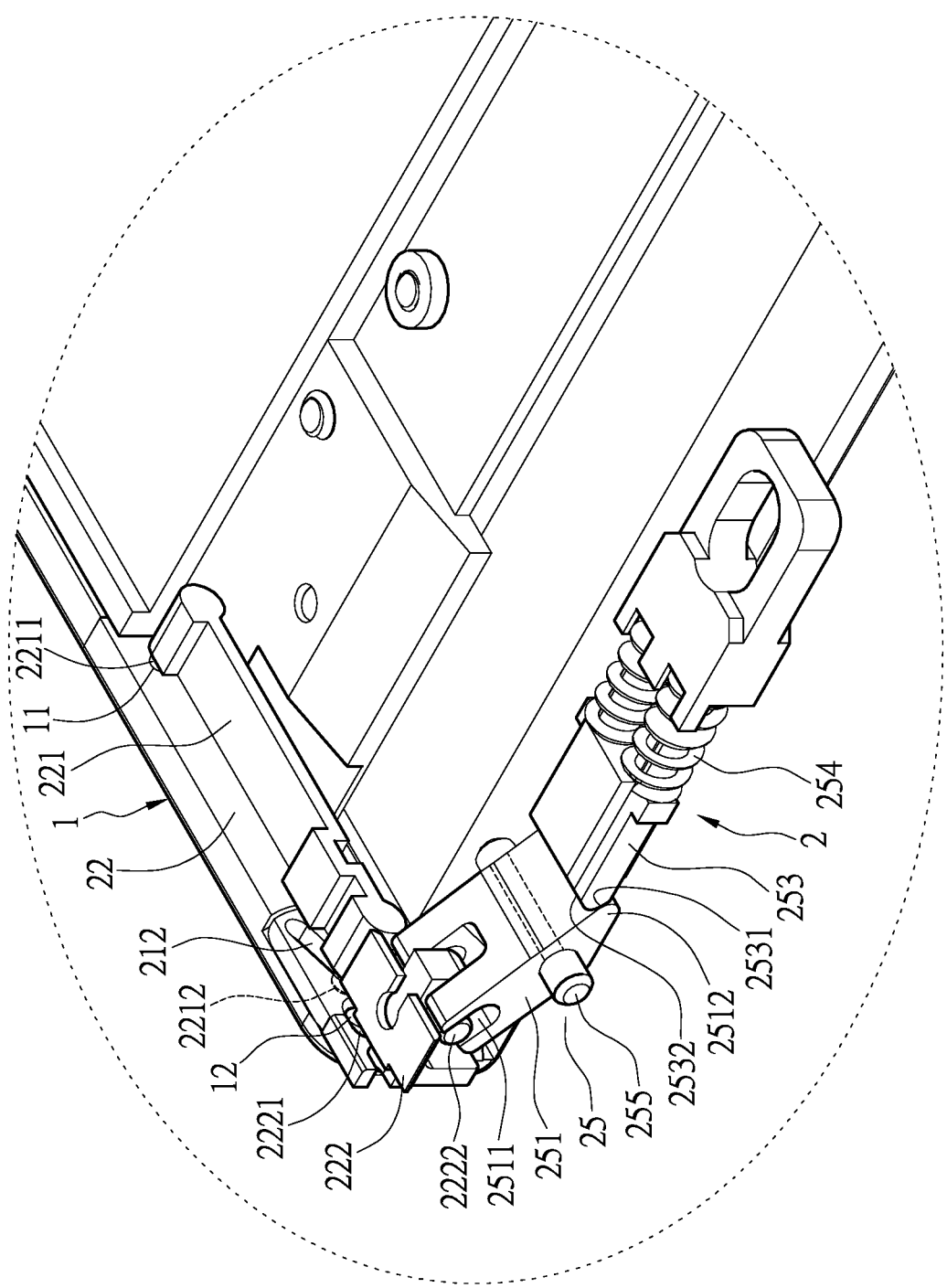
FIG. 3 is an enlarged view of portion III of FIG. 1.
Figure 4:
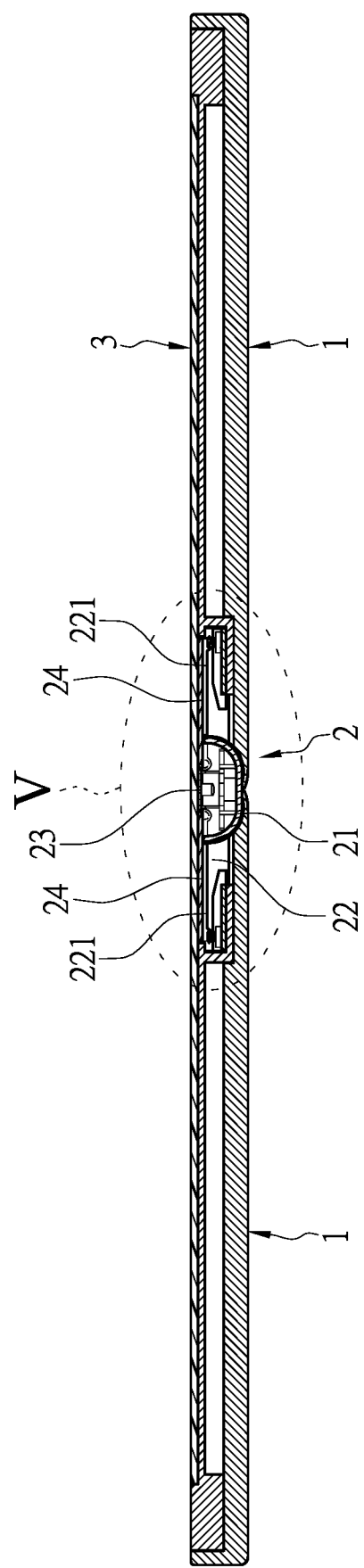
FIG. 4 is a cross-sectional view taken along a cross-sectional line IV-IV of FIG. 1.
Figure 5:
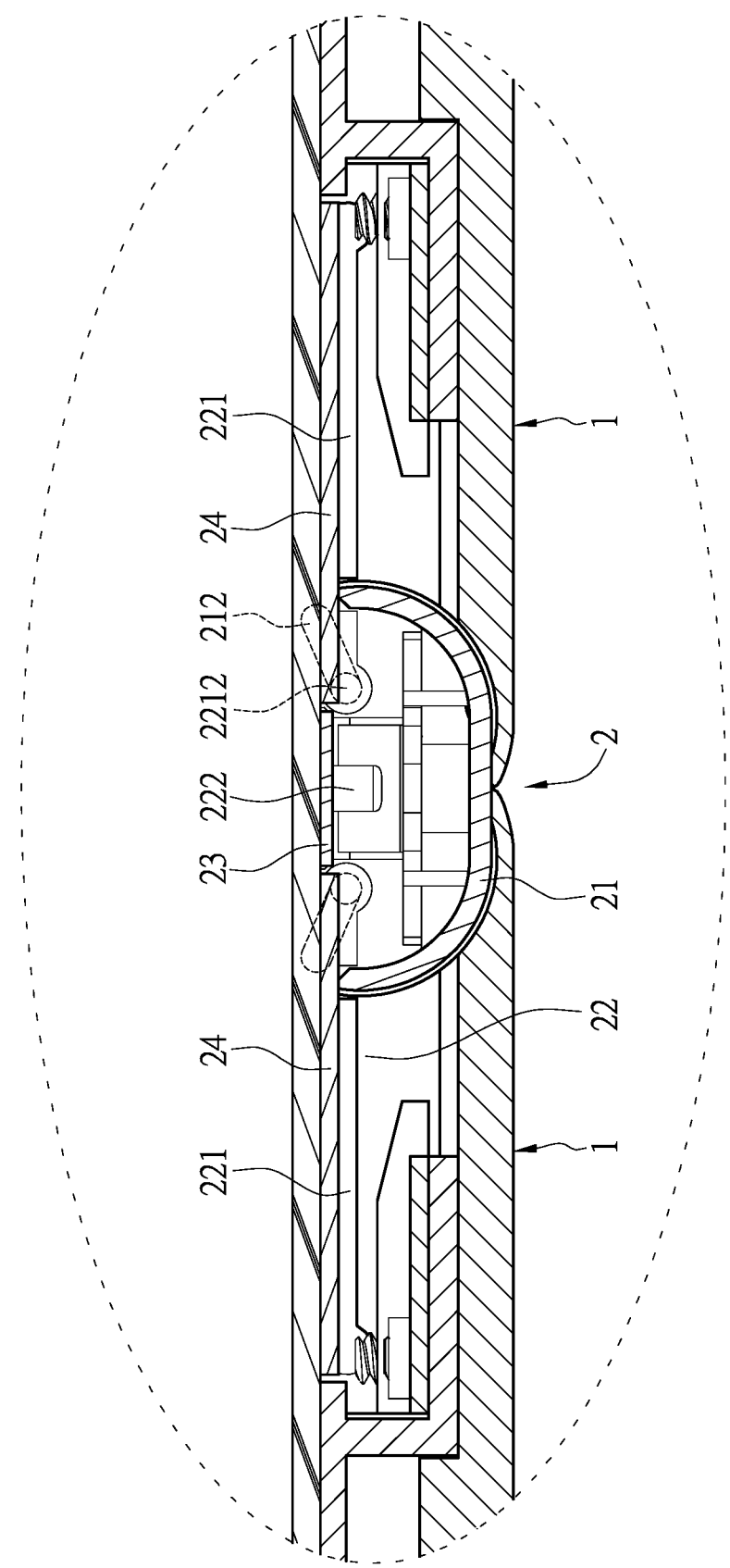
FIG. 5 is an enlarged view of portion V of FIG. 4.
Figure 6:
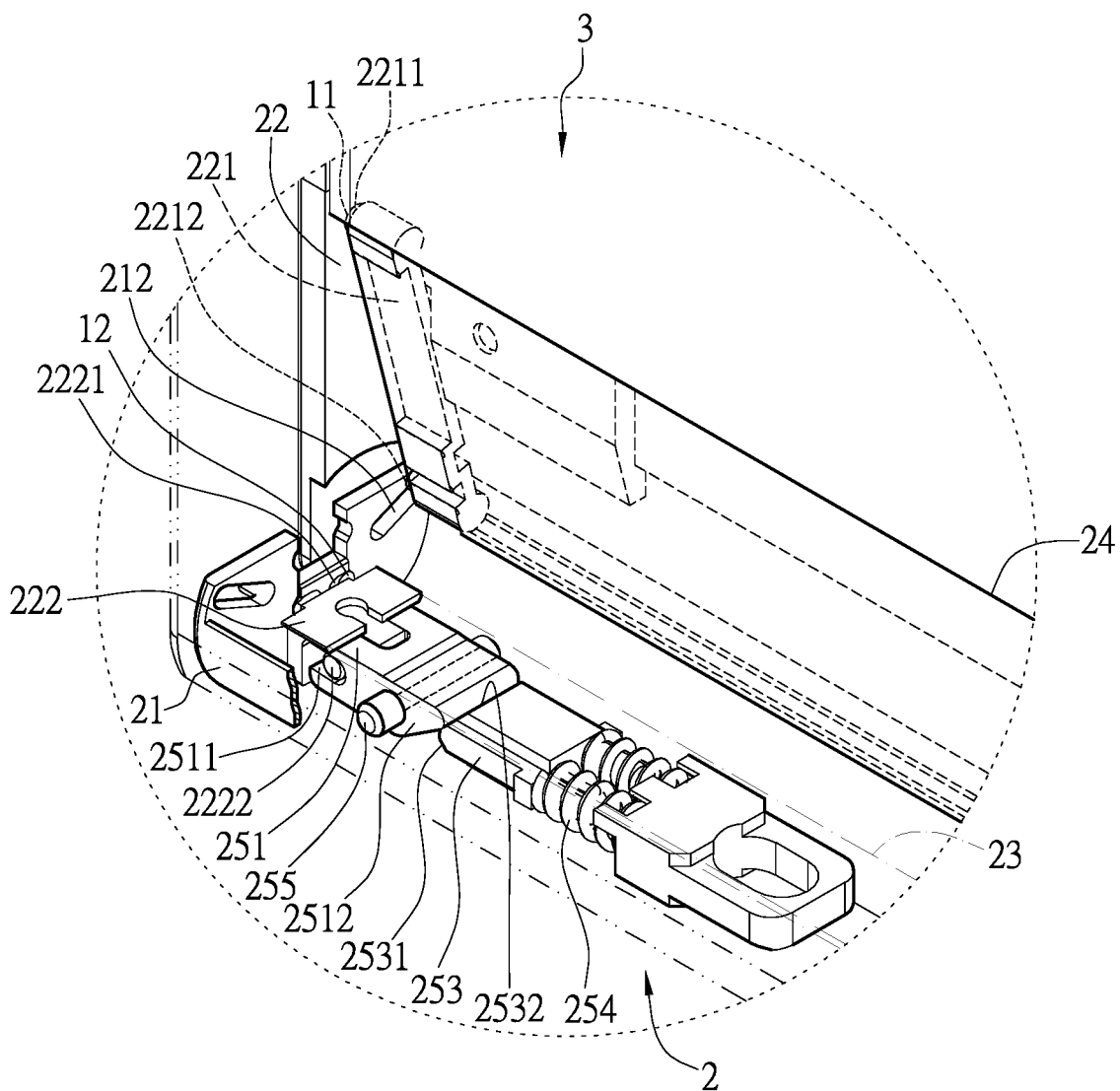
FIG. 6 is an enlarged view of portion VI of FIG. 2.
Figure 7:
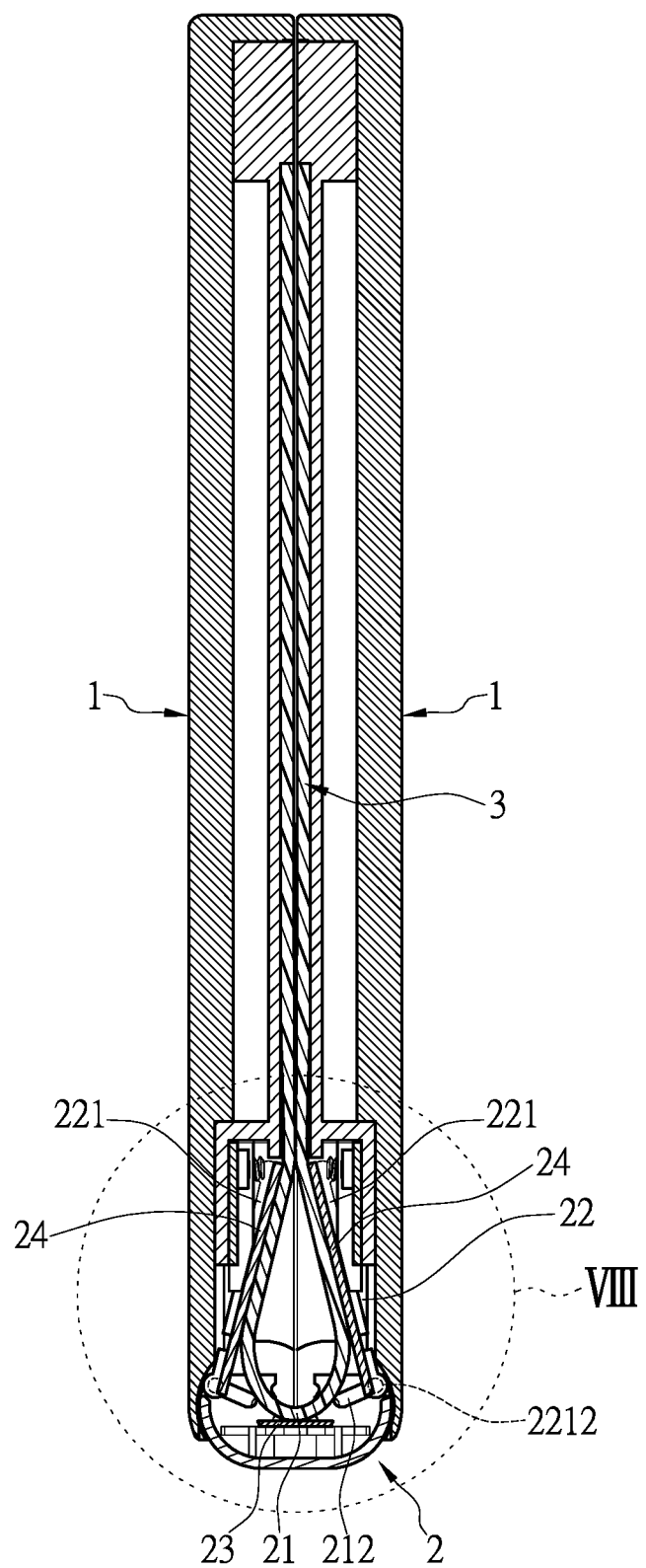
FIG. 7 is a cross-sectional view taken along a cross-sectional line VII-VII of FIG. 2.

The interlocking seats 222 of the two supporting units 22 are liftably disposed on the retainer 21. Each of the interlocking seats 222 has two connecting slots 2221 arranged on two opposite sides thereof. Each of the two housings 1 has two connecting shafts 12 arranged on two opposite lateral sides thereof. The connecting shafts 12 are respectively cooperated with the connecting slots 2221, so that each of the interlocking seats 222 is connected to one of the lateral sides of the two housings 1. When the two housings 1 are rotated to locate on the same plane, the connecting shafts 12 of the two housings 1 can drive the interlocking seats 222 to upwardly move (as shown in FIG. 3). When the two housings 1 are rotated to stack with each other, the connecting shafts 12 of the two housings 1 can drive the interlocking seats 222 to downwardly move (as shown in FIG. 6).

The two positioning mechanisms 25 are respectively arranged adjacent to and positioned with the interlocking seats 222 of the two supporting units 22, so that when the interlocking seats 222 are upwardly or downwardly moved to a predetermined position, the two positioning mechanisms 25 can support and position the interlocking seats 222. Accordingly, the two positioning mechanisms 25 are configured to allow the two housings 1 to be selectively maintained at the flat position and the folded position. Moreover, the positioning mechanism 25 can be changed according to design requirements.

The first supporting plate 23 is fixed to the interlocking seats 222 of the two supporting units 22, so that the first supporting plate 23 and the interlocking seats 222 can be upwardly or downwardly moved at the same time. In the present embodiment, the first supporting plate 23 can be fixed to the interlocking seats 222 by a wedging manner, an adhering manner, or a screwing manner. The two second supporting plates 24 are arranged at two opposite sides of the first supporting plate 23, and the two second supporting plates 24 are fixed to the connecting levers 221 of the two supporting units 22, so that the two second supporting plates 24 and the connecting levers 221 of the two supporting units 22 are moved at the same time. In the present embodiment, the two second supporting plates 24 are fixed to the connecting levers 221 of the two supporting units 22 by a wedging manner, an adhering manner, or a screwing manner. The bendable display 3 is mounted on the two housings 1, the first supporting plate 23, and the two second supporting plates 24. In the present embodiment, the bendable display 3 is fixed on top surfaces of the first supporting plate 23 and the two second supporting plates 24 of the supporting device 2 by an adhering manner, but the present disclosure is not limited thereto.

Figure 8:
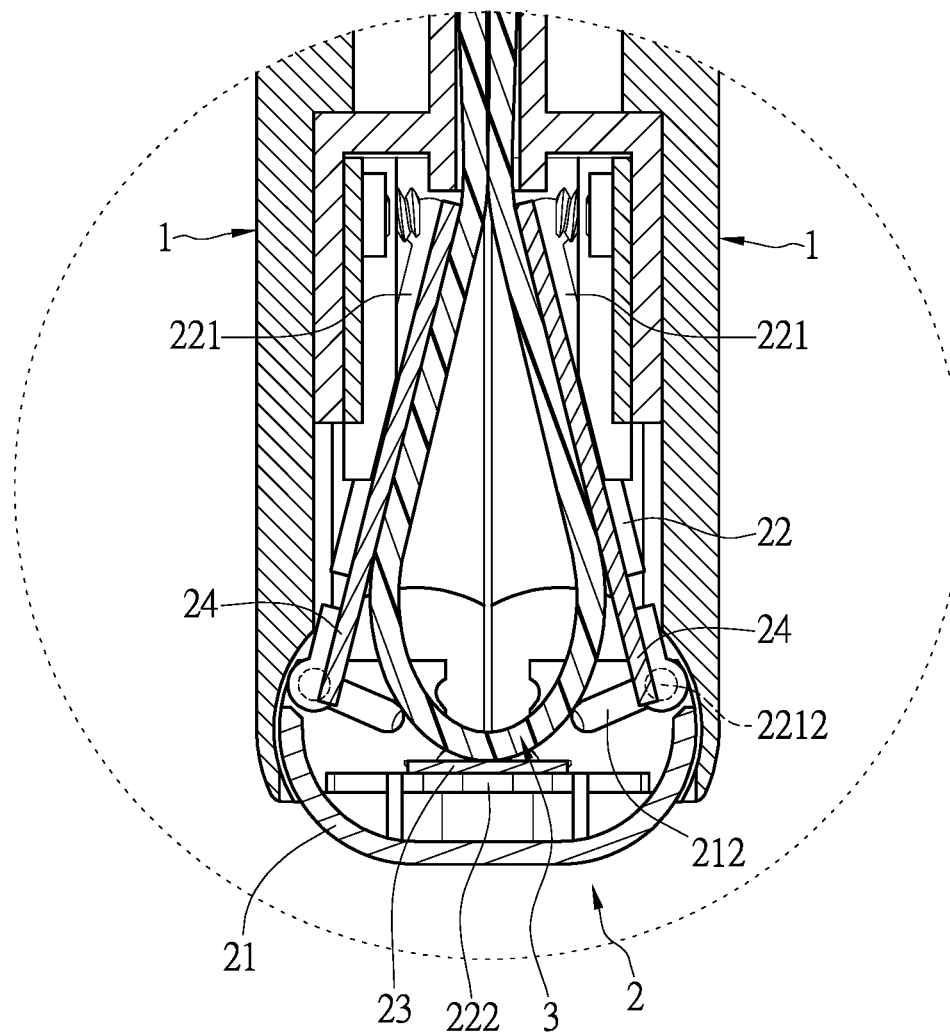
FIG. 8 is an enlarged view of portion VIII of FIG. 7.

When the two housings 1 are rotated to stack with each other, the two housings 1 can rotate the connecting levers 221 to move the two second supporting plates 24 along a direction away from each other (as shown in FIG. 8), and the two housings 1 can drive the two interlocking seats 222 to downwardly move the first supporting plate 23. When the two interlocking seats 222 and the first supporting plate 23 are downwardly moved to a predetermined position, the two positioning mechanisms 25 are respectively used to position the two interlocking seats 222, thereby firmly maintaining the two housings 1 to be at the folded position. Moreover, when the two housings 1 are rotated to stack with each other, the first supporting plate 23 and the two second supporting plates 24 are outwardly moved by the supporting device 2 so as to jointly form a space that provides the bendable display 3 to deform therein.

As shown in FIG. 3 and FIG. 6, each of the two positioning mechanisms 25 includes a toggle lever 251, a cover 252 (as shown in FIG. 1), a slider 253, and an elastic member 254. As the two positioning mechanisms 25 are of the same structure, the following description discloses the structure of just one of the two positioning mechanisms 25 and the corresponding components (e.g., the retainer 21 and the interlocking seat 222) for the sake of brevity. The toggle lever 251 is pivotally connected to the retainer 21 by a spinning shaft 255 thereof. The toggle lever 251 has a slot 2511 and an abutting end 2512 arranged on two opposite ends thereof, the interlocking seat 222 has a protruding shaft 2222 corresponding in position to the slot 2511, and the toggle lever 251 and the interlocking seat 222 are connected to each other through a cooperation between the slot 2251 and the protruding shaft 2222 thereof. The slider 253 is slidably disposed on the retainer 21, and the cover 252 abuts against the slider 253. The elastic member 254 abuts against one end of the slider 253 for moving the slider 253 toward the toggle lever 251, and the other end of the slider 253 has a first positioning surface 2531 and a second positioning surface 2532. Specifically, each of the first positioning surface 2531 and the second positioning surface 2532 of the slider 253 is a slanting surface, and the second positioning surface 2532 is arranged above the first positioning surface 2531 (or is arranged adjacent to the bendable display 3).

When the two housings 1 are rotated to stack with each other, the connecting shafts 12 of the two housings 1 can drive the two interlocking seats 222 to downwardly move (as shown in FIG. 6), the two interlocking seats 222 drive the first supporting plate 23 to downwardly move, and each of the interlocking seats 222 drives the corresponding toggle lever 251 to spin along a first direction (e.g., a clockwise direction shown in FIG. 6, that is to say, the slot 2511 is downwardly moved and the abutting end 2512 is upwardly moved), so that the abutting end 2512 of the corresponding toggle lever 251 is abutted against the second positioning surface 2532 of the corresponding slider 253. Accordingly, the two housings 1 at the folded position can be firmly maintained. When the two housings 1 are rotated to locate on the same plane, the connecting shafts 12 of the two housings 1 can drive the interlocking seats 222 to upwardly move (as shown in FIG. 3), the two interlocking seats 222 drive the first supporting plates 23 to upwardly move, and each of the interlocking seats 222 drives the corresponding toggle lever 251 to spin along a second direction (e.g., a counterclockwise direction shown in FIG. 3, that is to say, the slot 2511 is upwardly moved and the abutting end 2512 is downwardly moved) opposite to the first direction, so that the abutting end 2512 of the corresponding toggle lever 251 is abutted against the first positioning surface 2531 of the corresponding slider 253. Accordingly, the two housings 1 at the flat position can be firmly maintained.

In conclusion, when the two housings are moved to stack with each other, the supporting device can drive the two second supporting plates to move away from each other and to drive the first supporting plate to downwardly move, so that the supporting device can provide a suitable space for allowing the bendable display to deform therein, and the cooperation between the supporting device and the bendable display is simplified and still allows the bendable display to be protected through the supporting device. Accordingly, the productivity of the bendable displaying apparatus can be increased. In addition, the two positioning mechanisms of the supporting device can provide a supporting force to the bendable displaying apparatus, thereby allowing the bendable displaying apparatus to be selectively maintained at the flat position and the folded position.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A bendable displaying apparatus, comprising:
   two housings;
   a supporting device disposed between the two housings and pivotally connected to the two housings, wherein the supporting device includes:
      a retainer having two opposite end boards, wherein each of the two end boards of the retainer has two slanted sliding slots recessed therein, and two sides of the two housings are respectively and pivotally connected to the two end boards of the retainer;
      two supporting units disposed on the retainer and respectively located adjacent to the two end boards of the retainer, wherein each of the two supporting units includes:
         two connecting levers each having a first end portion and an opposite second end portion, wherein the first end portions of the connecting levers of the two supporting units are respectively and pivotally connected to the two sides of the two housings, and the second end portions of the connecting levers of the two supporting units each have a sliding shaft, and wherein the sliding shafts of the connecting levers of the two supporting units are respectively and slidably arranged in the slanted sliding slots of the retainer, so that the second end portions of the connecting levers of the two supporting units are respectively slidable relative to the two end boards of the retainer; and
         each of the two supporting units having an interlocking seat, wherein the interlocking seats of the two supporting units are liftably disposed on the retainer and each are connected to the two housings;
      a first supporting plate fixed to the interlocking seats of the two supporting units;
      two second supporting plates fixed to the connecting levers of the two supporting units; and
      two positioning mechanisms respectively arranged adjacent to and positioned with the interlocking seats of the two supporting units,
      wherein when the two housings are rotated to locate on a same plane and are located at a flat position, the sliding shafts of the connecting levers are arranged at one end of the slanted sliding slots adjacent to the interlocking seats,
      wherein when the two housings are rotated to stack with each other and are located at a folded position, the sliding shafts of the connecting levers are arranged at the other end of the slanted sliding slots away from the interlocking seats, and
      wherein when the two housings are rotated from the flat position toward the folded position, each of the sliding shafts is moved along the corresponding slanted sliding slot, and the two housings drive the interlocking seats of the two supporting units to downwardly move; and
   a bendable display mounted on the two housings, the first supporting plate, and the two second supporting plates,
   wherein when the two housings are rotated to stack with each other, the two housings rotate the connecting levers of the two supporting units to move the two second supporting plates along a direction away from each other, and the two housings drive the interlocking seats of the two supporting units to downwardly move the first supporting plate, so that the two second supporting plates and the first supporting plate jointly form a space that provides the bendable display to deform therein, and wherein the two positioning mechanisms are configured to allow the bendable displaying apparatus to be selectively maintained at the flat position and the folded position.

2. The bendable displaying apparatus according to claim 1, wherein in one of the two sides of the retainer, a distance between one ends of the two sliding slots is less than a distance between the other ends of the two sliding slots.

3. The bendable displaying apparatus according to claim 1, wherein each of the two positioning mechanisms includes a toggle lever, a slider, and an elastic member, wherein in each of the two positioning mechanisms, the toggle lever is pivotally connected to the corresponding retainer by a spinning shaft thereof, one end of the toggle lever is connected to the corresponding interlocking seat, and the other end of the toggle lever has an abutting end, wherein in each of the two positioning mechanisms, the slider is slidably disposed on the retainer, one end of the slider is abutted against the elastic member, and the other end of the slider has a first positioning surface and a second positioning surface, wherein when the two housings are rotated to stack with each other, each of the interlocking seats drives the corresponding toggle lever to spin along a first direction, so that the abutting end of the corresponding toggle lever is abutted against the second positioning surface of the corresponding slider, and wherein when the two housings are rotated to locate on the same plane, each of the interlocking seats drives the corresponding toggle lever to spin along a second direction opposite to the first direction, so that the abutting end of the corresponding toggle lever is abutted against the first positioning surface of the corresponding slider.

4. The bendable displaying apparatus according to claim 3, wherein in each of the two positioning mechanisms, each of the first positioning surface and the second positioning surface of the slider is a slanting surface, and the second positioning surface is arranged above the first positioning surface.

5. The bendable displaying apparatus according to claim 3, wherein each of the toggle levers has a slot, each of the interlocking seats has a protruding shaft, and each of the toggle levers and the corresponding interlocking seat are connected to each other through a cooperation between the slot and the protruding shaft thereof.

6. A supporting device for being pivotally connected to two housings, comprising:
 a retainer having two opposite end boards, wherein the two end boards of the retainer are configured to respectively and pivotally connect to two sides of the two housings, and each of the two end boards of the retainer has two slanted sliding slots recessed therein;
 two supporting units disposed on the retainer and respectively located adjacent to the two end boards of the retainer, wherein each of the two supporting units includes:
  two connecting levers each having a first end portion and an opposite second end portion, wherein the first end portions of the connecting levers of the two supporting units are configured to respectively and pivotally connect to the two sides of the two housings, and the second end portions of the connecting levers of the two supporting units each have a sliding shaft, and wherein the sliding shafts of the connecting levers of the two supporting units are respectively and slidably arranged in the slanted sliding slots of the retainer, so that the second end portions of the connecting levers of the two supporting units are respectively slidable relative to the two end boards of the retainer; and
  each of the two supporting units having an interlocking seat, wherein the interlocking seats of the two supporting units are liftably disposed on the retainer and each are configured to connect to the two housings,
 wherein when the two housings are rotated to locate on a same plane and are located at a flat position, the sliding shafts of the connecting levers are arranged at one end of the slanted sliding slots adjacent to the interlocking seats,
 wherein when the two housings are rotated to stack with each other and are located at a folded position, the sliding shafts of the connecting levers are arranged at the other end of the slanted sliding slots away from the interlocking seats, and
 wherein when the two housings are rotated from the flat position toward the folded position, each of the sliding shafts is moved along the corresponding slanted sliding slot, and the two housings drive the interlocking seats of the two supporting units to downwardly move; and
 a first supporting plate fixed to the interlocking seats of the two supporting units;
 two second supporting plates respectively fixed to the connecting levers of the two supporting units; and
 two positioning mechanisms respectively arranged adjacent to and positioned with the interlocking seats of the two supporting units
 wherein when the two housings are rotated to stack with each other, the two housings rotate the connecting levers of the two supporting units to move the two second supporting plates along a direction away from each other, and the two housings drive the interlocking seats of the two supporting units to downwardly move the first supporting plate, so that the two second supporting plates and the first supporting plate jointly form a space that provides a bendable display to deform therein, and wherein the two positioning mechanisms are configured to allow the supporting device to be selectively maintained at the flat position and the folded position.

7. The supporting device according to claim 6, wherein in one of the two sides of the retainer, a distance between one ends of the two sliding slots is less than a distance between the other ends of the two sliding slots.

8. The supporting device according to claim 6, wherein each of the two positioning mechanisms includes a toggle lever, a slider, and an elastic member, wherein in each of the two positioning mechanisms, the toggle lever is pivotally connected to the corresponding retainer by a spinning shaft thereof, one end of the toggle lever is connected to the corresponding interlocking seat, and the other end of the toggle lever has an abutting end, wherein in each of the two positioning mechanisms, the slider is slidably disposed on the retainer, one end of the slider is abutted against the elastic member, and the other end of the slider has a first positioning surface and a second positioning surface, wherein when the two housings are rotated to stack with each other, each of the interlocking seats drives the corresponding toggle lever to spin along a first direction, so that the abutting end of the corresponding toggle lever is abutted against the second positioning surface of the corresponding slider, and wherein when the two housings are rotated to locate on the same plane, each of the interlocking seats drives the corresponding toggle lever to spin along a second direction opposite to the first direction, so that the abutting end of the corresponding toggle lever is abutted against the first positioning surface of the corresponding slider.

9. The supporting device according to claim 8, wherein in each of the two positioning mechanisms, each of the first positioning surface and the second positioning surface of the slider is a slanting surface, and the second positioning surface is arranged above the first positioning surface.

10. The supporting device according to claim 8, wherein in each of the toggle levers has a slot, each of the interlocking seats has a protruding shaft, and each of the toggle levers and the corresponding interlocking seat are connected to each other through a cooperation between the slot and the protruding shaft thereof.

* * * * *